June 13, 1939.  C. B. LARSEN  2,162,338
SET-UP DEVICE
Filed Sept. 22, 1938  2 Sheets-Sheet 1

INVENTOR.
Carl B Larsen
BY Emerson B. Donnell
ATTORNEY

June 13, 1939. C. B. LARSEN 2,162,338
SET-UP DEVICE
Filed Sept. 22, 1938 2 Sheets-Sheet 2
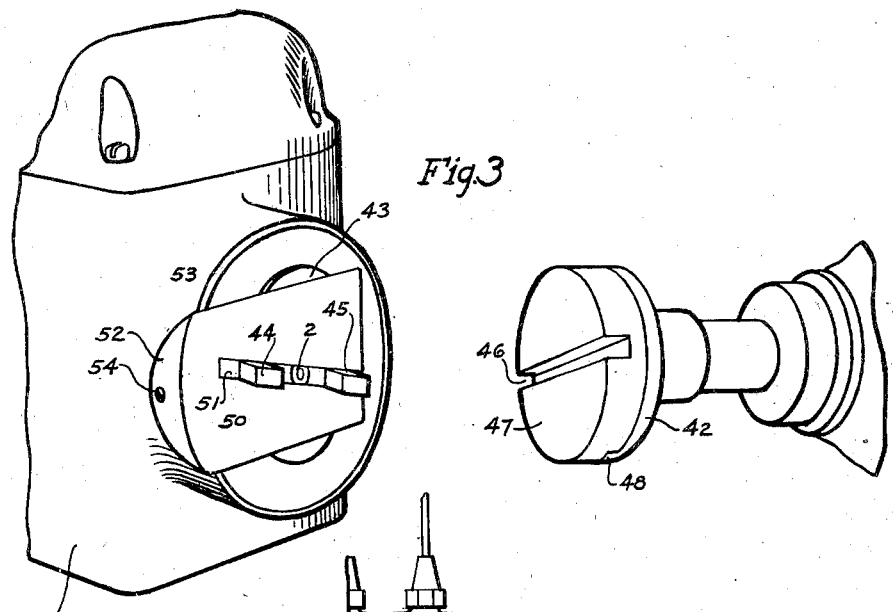
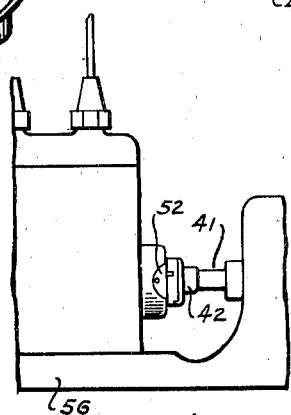
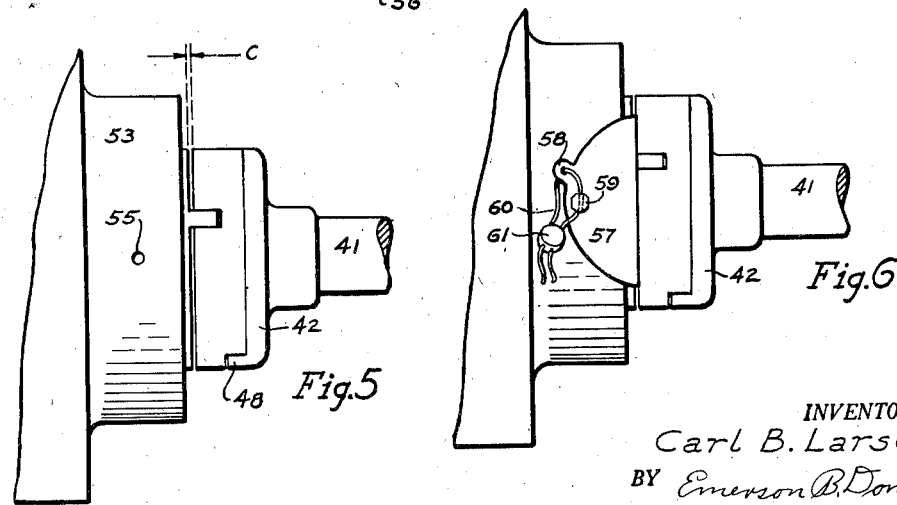
INVENTOR.
Carl B. Larsen
BY Emerson B. Donnell
ATTORNEY Patented June 13, 1939

2,162,338

UNITED STATES PATENT OFFICE 2,162,338

SET-UP DEVICE

Carl B. Larsen, Racine, Wis., assignor to J. I. Case Company, Racine, Wis., a corporation Application September 22, 1938, Serial No. 231,179

10 Claims. (Cl. 123—149)

The present invention relates to timed instruments such as magnetos, injection apparatus, and the like, applicable to internal combustion engines, and more particularly to a method and means for accurately installing such instruments on the engine to which they are to be attached.

An object of the invention is to generally improve such methods and the construction and operation of such means, and a further object is to provide a new and useful set-up element or device for use in facilitating the installation of a timed instrument by insuring correct timing of the operative elements thereof with those of the engine, and also by measuring and insuring correct operating clearance between certain parts thereof and cooperating parts of the engine.

A further object is to provide a spacer element which may remain in place between the operative elements of the instrument and engine until the installation of the former is otherwise complete, after which the spacer may be removed without disturbing the instrument.

A further object is to provide such a device which may be sealed in place to prevent tampering with the instrument.

Further objects and advantages will appear from the following specification and accompanying drawings, in which:

Fig. 3 is a perspective view of the front of a timed instrument with the device according to the invention in place and in proximity to a driving element on the engine.

Fig. 4 is a side elevation of a portion of an injection pump in place on an engine with the device of the invention still in place.

Fig. 5 is a similar view of a portion of Fig. 4 with the device removed.

Fig. 6 is a similar view showing a similar device equipped with sealing means to prevent unauthorized manipulation of the instrument.

Similar reference characters have been applied to the same parts throughout the drawings and specification.

Figure 1:
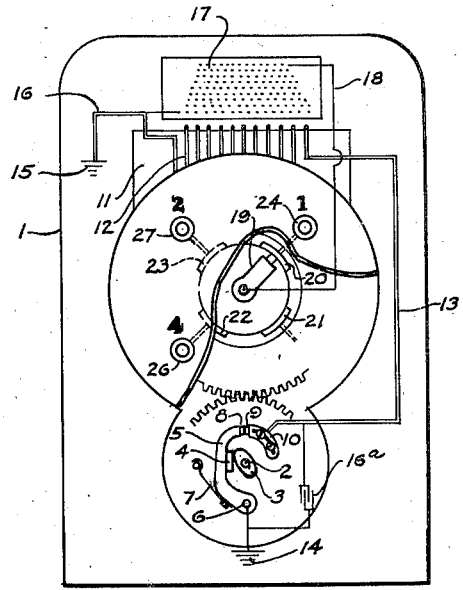
Figure 1 is an elevation with parts broken away, and partly diagrammatic in character, of a magneto showing certain operative parts in correct relation for installation.

Figure 1 shows a magneto, representative of a timed instrument to which the invention is applicable, the parts being in the position in which it is desired to maintain them up to and during the time that the instrument is installed, although other positions than at the breaking point for No. 1 cylinder could equally well be used as setting-up positions for installing the instrument, provided the engine parts were first put in position to properly coordinate with the position of the instrument, and nothing in this description is to be taken to limit the setting up position to No. 1 top dead center, as illustrated, or in fact in any other manner except as defined in the annexed claims.

The magneto of Fig. 1 includes a frame portion 1 having journaled therein a rotor shaft 2 carrying a cam 3 actuating, through a cam follower block 4, a breaker arm 5, pivoted on a pin 6 and urged by a spring 7 in a direction to cause a contact point 8 on the arm to contact a point 9 on an adjustable bracket 10, the impulses of the cam as it rotates causing the contact points to open and close in well-known manner.

A magnetic rotor of well-known type not shown, on shaft 2, causes magnetic impulses in a core 11, which induce a current flow in a primary coil 12, the current passing, for example, through a lead 13 to above mentioned bracket 10, through points 9 and 8, breaker arm 5 and pin 6 to the frame 1 at 14, thence through said frame to a point 15 and through a lead 16 to primary coil 12, a condenser 16$^a$ being connected in parallel with the points 8 and 9 as shown for well-known purposes. At a suitable interval in the current flow cam 3 opens contacts 8 and 9, interrupting the current and causing in well-known manner the induction of a high voltage in secondary coil 17, the secondary current flowing through a lead 18 to a rotatable distributor arm 19, through which it is communicated to one or another of segments 20, 21, 22 and 23, connected respectively with terminals 24, 25, (not shown) 26 and 27, which are connected by leads 28, 29, 30 and 31 (Fig. 2) with the corresponding spark plugs 32, 33, 34 and 35 of the engine, being in the present instance for cylinders No. 1, 3, 4, 2, respectively.

Figure 2:
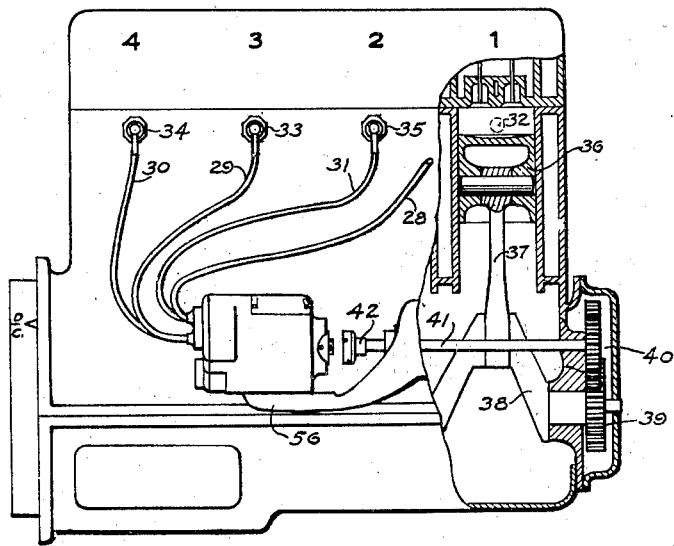
Fig. 2 is a side elevation of an engine with parts broken away to show certain operative elements in position for installation of a magneto.

The position shown in the magneto parts is for sparking cylinder No. 1, and in Fig. 2 the piston 36 of this cylinder is shown on top dead center— the position for receiving the spark. Connecting rod 37 actuates a crank-shaft 38, which drives, through gears 39 and 40, a shaft 41 carrying a coupling element 42, which drives the magneto in correct timed relation to the engine.

Obviously it is very important that the magneto be installed on the engine with the rotor in correct relation with shaft 41, and also with distributor arm 19 in contact with the segment connected with the cylinder which is ready to be fired, or the sparks will occur either in the wrong cylinders, or at the wrong times, and the engine will not run. It is to facilitate such correct installation that this invention has been devised.

As seen more particularly in Fig. 3, the magneto, or other instrument has a coupling 43 on shaft 2 through which it is driven, in the case of a magneto the coupling being commonly of the well-known impulse type, and having driving lugs 44 and 45 for engagement with a slot 46 in a floating member 47, engaged by a similar slot with a key 48 on above mentioned coupling element 42, through which the magneto is driven from the shaft, the floating element providing for a limited amount of tolerance in the alignment of the parts without introducing any strain in the rotating parts of the magneto.

Obviously, with the engine placed so that No. 1 cylinder is on top dead center, slot 46 will take some definite position, and the parts are so arranged, as is common practice, by any well-known adjusting expedient not shown, and forming no part of the present invention, so that, under these conditions, such position will correspond with the position of lugs 44 and 45 on coupling 43 when the magneto is set in position to fire No. 1 cylinder, as shown in Fig. 1, although, as above suggested, the invention is not to be taken as limited to the use of No. 1 cylinder as a reference, the principle being equally applicable to setting up on any other cylinder than No. 1, within the contemplation of the invention.

Various methods are known for obtaining the position of the engine parts with cylinder No. 1 ready to fire, and with coupling element 42 in some definite predetermined position and, to insure that the magneto is correctly positioned when it is installed, a locking element 50 is provided, formed of suitable sheet material and having a slot 51 disposed at a suitable position to engage lugs 44 and 45 and to hold them in correct position to maintain the magneto parts in the position shown in Fig. 1. Member 50 has an ear 52 extending backwardly about an extension housing portion 53 and fixed therewith as by a screw or other suitable fastening means 54 engaged in a hole 55 (Fig. 5) for positively preventing rotation of the member and accordingly of the magneto parts.

In use the member 50 will be applied to the magneto at the factory where the magneto is assembled, and after the parts are adjusted to the position shown in Fig. 1, the device insuring that the magneto will not get out of position during any subsequent handling, and before its installation on the engine.

It is to be noted that the lugs 44 and 45 project through the member 50, and are engageable with slot 46 while the member 50 is still in place on the magneto. This procedure may be followed, the magneto or other instrument being engaged with the element 47 while the member 50 is still in place, and the instrument bolted or otherwise secured to a part of the engine as 56, as shown in Fig. 4.

It is desirable that there be a limited amount of space or end-play in the coupling assembly, and with this in view the thickness of member 50 may be made of the desired value, such for example as .015″ inch. The parts are then assembled with the member 50 in contact with element 47 and without clearance, after which screw 54 is removed and the member 50 slipped out and discarded, or otherwise disposed of, leaving a clearance space C determined by the thickness of the member. The device thus provides a substantially fool-proof means for installing a magneto, injection pump, or other instrument intended to run in definite timed relation to an engine or the like, and is especially useful when the instrument is to be shipped a long distance for installation, but it is also useful for preventing displacement of the parts during ordinary handling and for obtaining correct end-play even where the problem of transportation is not involved.

In order to prevent tampering with the instrument a modified type of device 57, Fig. 6, may be provided with an ear 58 and a screw 59 having a bore through which is threaded a wire 60, a seal 61 of suitable or well-known type being fixed on the wire. The device cannot be removed without breaking the seal, and any tampering with it that may have occurred is at once apparent. Other well-known sealing means are contemplated as equivalent and within the contemplation of the invention.

The above being an illustrative embodiment of the invention, what is claimed as new and desired to be secured by Letters Patent of the United States is:

1. In combination with a timed instrument having a frame portion and a coupling element, and an engine having a driving element, interengaging means on said coupling and driving elements, and a locking device engaged with the interengaging means on the coupling element for locking the locking device and element immovably together, and means for anchoring the locking device to the instrument for holding said coupling element in predetermined position until the locking device is removed.

2. In combination with a timed instrument having a frame portion and a coupling element, and an engine having a driving element, interengaging means on said coupling and driving elements and a shim of predetermined thickness engaged with the interengaging means on the coupling element for locking the shim and element immovably together, and means for anchoring the shim to the instrument for holding said coupling element in predetermined position until the shim is removed, the thickness of the shim being so chosen as to define the necessary clearance between said driving element and said coupling element when the instrument is mounted in place on the engine.

3. In a timed instrument a coupling element having a tongue for engagement with a driving element for actuating the instrument in predetermined timed relation, and a shim engaged with said tongue and anchored to the instrument to maintain said driving element in predetermined position pending installation of the instrument, said shim being insertible between said driving element and said coupling element while the instrument is so mounted so that the shim need not be removed until the instrument is otherwise completely installed.

4. In a magneto for an internal combustion engine, said magneto having a circuit breaker element, a distributor arm, a plurality of contacts adapted to be connected successively with said distributor arm, and a coupling for connecting the magneto to be driven from the engine, said engine having a plurality of cylinders connected respectively with the plurality of contacts and a driving element adapted to stand in a predetermined position when a predetermined cylinder of the engine is ready to fire, and said coupling element being adapted to stand in a corresponding position when said circuit breaker element is about to break, and said distributor arm is connected with the contact leading to said predetermined cylinder, interengaging means on said coupling and driving elements and a locking device engaged with the interengaging means on the coupling element for locking the locking device and element immovably together, and means for anchoring the locking device to the magneto for holding said coupling element in said corresponding position until the locking device is removed.

5. A magneto having a coupling element, and means detachably secured to the magneto for maintaining the coupling element in predetermined spaced relation to a driving means adapted to engage said coupling element.

6. In a magneto, a spacing device adapted to be detachably secured between the coupling and driving elements of the magneto, said device comprising a shim-like element of suitable thickness and dimensions to establish and maintain said elements at predetermined distance from each other.

7. The combination of a magneto having a coupling element and an engine having a driving element spaced from and engaging said coupling element, and means adapted to be interposed between said elements for spacing the coupling element in predetermined position in relation to the driving element.

8. A magneto having a coupling element adapted to be engaged and actuated by the driving element of an engine spaced from the coupling element, and means detachably insertible between said elements to position and maintain said elements in spaced relation during and subsequent to the installation of the magneto.

9. A magneto having a coupling element adapted to be engaged and actuated by the driving element of an engine spaced from the coupling element, and means detachably insertible between said elements and engaged between the coupling element and the body of the magneto to position said coupling element in correct relation to the driving element for engagement therewith, and to position and maintain said elements in spaced relation during and subsequent to the installation of the magneto.

10. In combination with a timed instrument having a frame portion and a coupling element, and an engine having a driving element, interengaging means on said coupling and driving elements, and a locking device engaged with the interengaging means on the coupling element for locking the locking device and element immovably together, means for anchoring the locking device to the instrument for holding said coupling element in predetermined position until the locking device is removed, and sealing means engaged between the locking means and the instrument for indicating whether said locking means has been disturbed.

CARL B. LARSEN.